June 12, 1945.   W. C. TROENDLE   2,378,339
SAFETY STAND
Filed May 5, 1944   2 Sheets-Sheet 1

INVENTOR.
Wm C Troendle
BY Charles R. Fay
atty

June 12, 1945.　　W. C. TROENDLE　　2,378,339
SAFETY STAND
Filed May 5, 1944　　2 Sheets-Sheet 2

INVENTOR.
Wm. C. Troendle
BY Charles R. Fay
atty.

Patented June 12, 1945

2,378,339

UNITED STATES PATENT OFFICE 2,378,339

SAFETY STAND

William C. Troendle, Gardner, Mass., assignor to Thayer Company, Gardner, Mass., a corporation of Massachusetts Application May 5, 1944, Serial No. 534,276

7 Claims. (Cl. 188—20)

This invention relates to safety stands particularly for use with infants' vehicles such as baby carriages.

Objects of the invention include the provision of an improved safety stand comprising at least one member which swings on an axis to bring the member down from inoperative position in a plane transverse to the wheels of the carriage whereby the ground engaging end of the element will provide the safety stand function in a position touching or extremely close to the ground, thus avoiding the prior art difficulty which exists in stands of the type swinging on axes parallel to the wheel axle, in which case the stand must come to rest at a point above the surface of the ground and thus allow a certain amount of tipping of the carriage before the stand touches the ground.

Further objects of the invention include the provision of a safety stand of the nature described comprising pivoted elements which swing on axes transverse to the wheel axle and are thus enabled to come substantially to the ground level without interference therewith during the swinging; and the provision of a safety stand as described which is combined with the wheel brake in such a way as to apply the brake when the stand is actuated to operative position and in which the brake maintains the safety stand in operative position.

Other objects and advantages of the invention will appear hereinafter.

Reference is to be had to the accompanying drawings, in which

Figure 5:
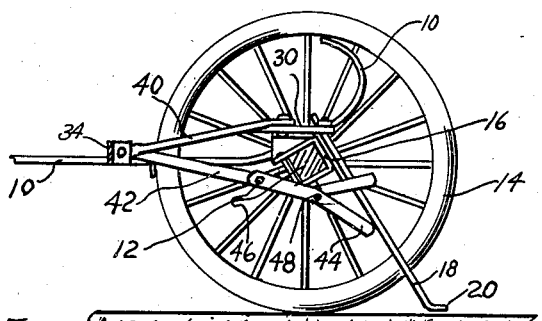
Fig. 5 is a view similar to Fig. 4 and showing the parts in operative position.

The present invention is directed for use on baby carriages but may be used on other vehicles where desired. In the drawings I have illustrated parallel side frame members 10 which are mounted on the rear axle 12, this axle rotatably mounting the wheels 14. Secured to the axle 12 there are provided a pair of brackets 16 close to the frame members 10 and each of these brackets journals a free ended element 18 for swinging movement on axes transverse to the axle. Elements 18 are provided with feet 20 (see particularly Fig. 5). These feet are just touching the ground or very slightly spaced therefrom when extended in the Fig. 2 and Fig. 5 positions. Stops 22 are provided to prevent excess travel of swingable elements 18.

Each element 18 has pivoted thereto a link 24 and 26 respectively, these links being the operating means for swinging elements 18 between the positions shown, and it will be noted that the links 24 and 26 are secured to elements 18 closely adjacent the pivot points 28 for the swinging elements.

A swingable lever or crank 30 is mounted in any convenient location preferably on axle 12 and the ends of the links 24 and 26 are pivoted thereto at opposite sides of the pivot point 32 so that by oscillation of the member 30 the elements 18 will be swung up and down between operative and inoperative positions.

I provide a spring steel brake rod 34 pivoted at 36 to each of the frame members 10 and equipped with adjustable brake shoes 38 for engagement with wheels 14. A link 40 connects the member 30 with the brake rod 34 and it will be seen that as the member 30 is oscillated from the Fig. 1 position to that of Fig. 2, the brake rod will be bowed forwardly to apply the brakes to the wheels, and also link 40 will actuate crank 30 so that links 24, 26 and elements 18 will be swung down.

I provide a lever 42 which is pivoted to the brake rod 34 and which extends forwardly below axle 12. A second lever 44 is pivoted intermediate the ends of 42 at 46 and is also pivoted to a bracket depending from the axle 12 as at 48.

Figure 1:
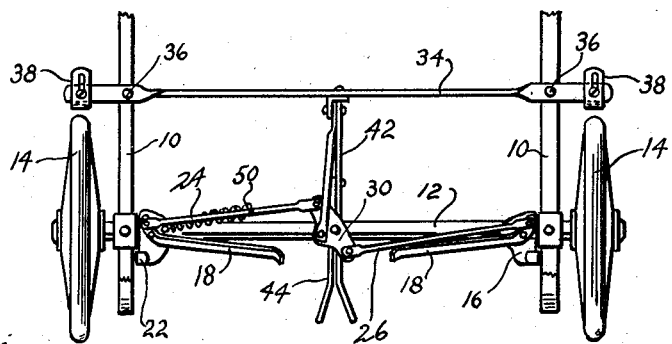
Fig. 1 is a top plan view of the rear axle of a vehicle to which the safety stand is applied and showing the same in inoperative position.
Figure 2:
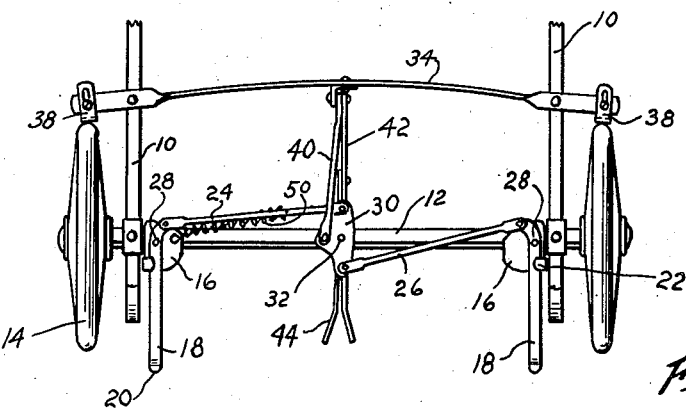
Fig. 2 is a view similar to Fig. 1 but showing the safety stand in operative position.
Figure 3:
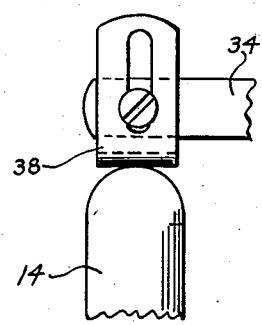
Fig. 3 is a detail view of the brake shoe.
Figure 4:
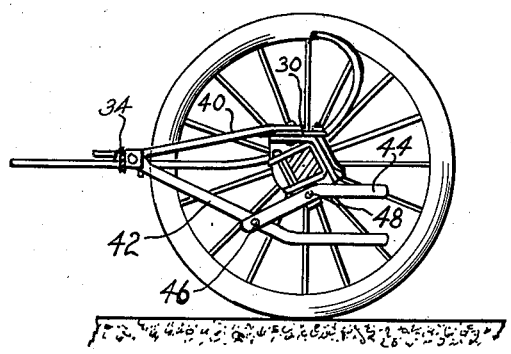
Fig. 4 is a section view through the rear axle showing the parts in inoperative position.

With the parts in inoperative position with the brakes released as shown in Figs. 1 and 4, the rearwardly extending end of lever 44 may be depressed by means of the foot or otherwise resulting in swinging upwardly of lever 42 and bowing out the brake rod 34 to the Fig. 2 position. When pivot point 46 rises above pivot 48, the thrust of the brake rod will clearly tend to maintain lever 44 in its farthermost clockwise position, i. e., link 40 will be latched and will hold member 30 in Fig. 2 position so that the elements 18 will be latched in extended condition.

To release the brakes and to retract the stand, or legs 18, the free end of lever 42 is depressed, releasing the dead center latch and spring 50 will come into play to move link 24 to the left and hence link 26 to the right, see Fig. 1, thus swinging up the elements 18. The brake rod 34 assists in this action by pushing link 40 to swing member 30 counterclockwise, and the parts are held by the spring and brake and brake rod in inoperative position.

This invention clearly provides a positively operating safety stand which by means of a simplified construction allows for almost exact positioning of the stand elements 18 in close proximity to the ground by swinging the elements on an axis transverse to the axle instead of on the usual axis parallel to the axle.

Having thus described my invention and the advantages thereof, I do not wish to be limited to the details herein disclosed, otherwise than as set forth in the claims, but what I claim is:

1. In a device of the class described, an axle, a pair of wheels thereon, a stand element pivotally mounted on an axis transverse of the axle, and lever means to swing the stand element in a plane substantially parallel to the axle between operative and inoperative positions.

2. In a device of the class described, an axle, a pair of wheels thereon, a frame, a brake rod, a stand element pivotally mounted on an axis transverse to the axle, lever means connected to the brake rod to operate the same, and a link secured to the brake rod and actuating the stand element to swing the latter in a plane transverse to the wheels.

3. In a device of the class described, an axle, a pair of wheels, a frame, a spring brake rod on the frame, a lever to actuate the brake rod, a link secured to the latter, a stand element swingable transversely of the frame, and means connecting the link and stand element for operation of the latter by the former.

4. In a device of the class described, an axle, a pair of wheels thereon, a frame on the axle, a crank lever, a link pivoted to the lever, a ground engageable stand element movable between operative and inoperative positions, and means connecting the link and stand element to extend the latter to operative position upon actuation of the crank lever, said stand element being movable in a plane parallel to the axle.

5. The device as recited in claim 4 wherein the stand element is mounted to swing on an axis perpendicular to the axle.

6. In a device of the class described, an axle, a frame, wheels on the axle, a swinging ground engaging element pivoted to the frame adjacent each wheel and having inoperative positions adjacent the axle and operative positions substantially perpendicular to the axle, and means to swing the elements in inoperative to operative positions, said means including a link for each element, a crank lever, said links being pivoted thereto, and means to oscillate the crank lever.

7. In a device of the class described, an axle, wheels thereon, a frame on the axle, a foot operative lever, a movable stand element having operative and inoperative positions, means to move the stand element between said positions and including a linkage between the lever and stand element, and a second lever pivoted at a fixed point and connected to the first named lever intermediate the ends of the latter to form a dead center latch.

WILLIAM C. TROENDLE.